(12) United States Patent
Liu (10) Patent No.: US 11,988,869 B2
(45) Date of Patent: May 21, 2024

(54) PHOTONIC BURIED INTERPOSER

(71) Applicant: ROCKLEY PHOTONICS LIMITED, Altrincham (GB)

(72) Inventor: Yangyang Liu, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 323 days.

(21) Appl. No.: 17/296,211

(22) PCT Filed: Mar. 31, 2020

(86) PCT No.: PCT/IB2020/000244
§ 371 (c)(1),
(2) Date: May 21, 2021

(87) PCT Pub. No.: WO2020/201829
PCT Pub. Date: Oct. 8, 2020

(65) Prior Publication Data
US 2022/0011509 A1 Jan. 13, 2022

Related U.S. Application Data (60) Provisional application No. 62/827,660, filed on Apr. 1, 2019.

(51) Int. Cl.
*G02B 6/122* (2006.01)
*G02B 6/13* (2006.01)
*G02B 6/12* (2006.01)

(52) U.S. Cl.
CPC ........... *G02B 6/1228* (2013.01); *G02B 6/131* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| | | | |
|---|---|---|---|
| 6,108,478 A | 8/2000 | Harpin et al. | |
| 10,007,060 B1 | 6/2018 | Qian et al. | |
| 2002/0131747 A1* | 9/2002 | Roberts | G02B 6/1228 385/132 |
| 2010/0166361 A1* | 7/2010 | Liu | G02B 6/124 438/31 |

(Continued)

FOREIGN PATENT DOCUMENTS

| | | |
|---|---|---|
| CN | 1246928 A | 3/2000 |
| CN | 1589415 A | 3/2005 |

(Continued)

OTHER PUBLICATIONS

U.K. Intellectual Property Office Examination Report, dated Mar. 4, 2022, for Patent Application No. GB2105765.8, 2 pages.
International Search Report and Written Opinion of the International Searching Authority, dated Jul. 22, 2020, corresponding to PCT/IB2020/000244, 13 pages.

(Continued)

*Primary Examiner* — Chad H Smith
(74) *Attorney, Agent, or Firm* — Lewis Roca Rothgerber Christie LLP (57) ABSTRACT

A photonic buried interposer for converting light between a first optical mode of a first optical component and a second optical mode of a second optical component, the second optical component being larger than the first optical component; the buried interposer comprising a bi-layer taper, the bi-layer taper comprising: a top device layer comprising an upper tapered waveguide; and a bottom device layer comprising a lower tapered waveguide; wherein the upper tapered waveguide extends from a first end for coupling to the first optical component to a second end for coupling to the second optical component; and the lower tapered waveguide starts from an intermediate location between the first and second ends and extends from the intermediate location to the second end.

16 Claims, 12 Drawing Sheets

| design | tip width (um) | S0S1 IL (dB) | S1 IL (dB) | S1S2 IL (dB) | S2 IL (dB) | total IL (dB) | total L (mm) |
|---|---|---|---|---|---|---|---|
| A | 1 | | 0.05 | | | 0.30 | 3.685 |
| B | 1.2 | 0.01 | 0.07 | 0.1 | 0.14 | 0.32 | 3.575 |
| C | 1.4 | | 0.10 | | | 0.35 | 3.520 |
| existing C band design | 0.5 | - | | 0.1 | 0.19 | 0.29 | 3.350 |

(56) References Cited

U.S. PATENT DOCUMENTS

2015/0346429 A1    12/2015   Lambert et al.
2015/0346430 A1*   12/2015   Li .......................... G02B 6/305
                                                               385/28

FOREIGN PATENT DOCUMENTS

| CN | 101055338 A | 10/2007 |
| CN | 102159975 A | 8/2011 |
| CN | 108132499 A | 6/2018 |
| CN | 109358395 A | 2/2019 |
| WO | WO 02/095453 A2 | 11/2002 |

OTHER PUBLICATIONS

Mitomi, Osamu et al., "Design of a Single-Mode Tapered Waveguide for Low-Loss Chip-to Fiber Coupling", IEEE Journal of Quantum Electronics, Aug. 1994, pp. 1787-1793, vol. 30, No. 8, IEEE.
Chinese Notification of the First Office Action, for Patent Application No. 202080006247.8, dated Aug. 26, 2023, 8 pages.
Partial English translation of the Chinese Notification of the First Office Action, for Patent Application No. 202080006247.8, dated Aug. 26, 2023, 12 pages.
Chinese Notification of the Second Office Action, for Patent Application No. 202080006247.8, mailed Jan. 27, 2024, 7 pages.
Partial English translation of the Chinese Notification of the Second Office Action, for Patent Application No. 202080006247.8, mailed Jan. 27, 2024, 10 pages.
Chinese Notification of the Decision on Rejection, for Patent Application No. 202080006247.8, mailed Apr. 11, 2024, 6 pages.

* cited by examiner

| design | tip width (um) | S0S1 IL (dB) | S1 IL (dB) | S1S2 IL (dB) | S2 IL (dB) | total IL (dB) | total L (mm) |
|---|---|---|---|---|---|---|---|
| A | 1 | 0.01 | 0.05 | 0.1 | 0.14 | 0.30 | 3.685 |
| B | 1.2 | | 0.07 | | | 0.32 | 3.575 |
| C | 1.4 | | 0.10 | | | 0.35 | 3.520 |
| existing C band design | 0.5 | - | 0.1 | | 0.19 | 0.29 | 3.350 |

Fig. 2

| design | tip width (um) | S0S1 PDL (dB) | S1 PDL (dB) | S1S2 PDL (dB) | S2 PDL (dB) | total PDL (dB) | total L (mm) |
|---|---|---|---|---|---|---|---|
| A | 1 |  | .010 | 0.05 |  | 0.06 | 3.685 |
| B | 1.2 | -.001 | .015 | 0.07 | .001 | 0.09 | 3.575 |
| C | 1.4 |  | .025 | 0.04 |  | 0.07 | 3.520 |
| existing C band design | 0.5 |  |  |  |  | 0.1 (spec) | 3.350 |

Fig. 3

| (um) | λ | 1.301 | | |
|---|---|---|---|---|
| S0 | w0Top | 2.6 | | |
| S1 | w1Top | 6 | 6 | 6 |
|    | w1Bot | 1 | 1.2 | 1.4 |
| S2 | w2Top | 13 | | |
|    | w2Bot | 13 | | |

Fig. 4A

Fig. 4B rib only, 400nm BOX

Fig. 5A

BIT tip, 300nm BOX

Gaussian, radius = 9.2/2 um

| design | w1Bot (um) | α | L12 (mm) | S1 IL (dB) | S1S2 IL (dB) | PDL (dB) |
|---|---|---|---|---|---|---|
| A | 1 | 0.3 | 3.485 | 0.05 | | 0.05 |
| B | 1.2 | 0.4 | 3.375 | 0.07 | 0.1 | 0.07 |
| C | 1.4 | 0.3 | 3.320 | 0.10 | | 0.04 |

Fig. 10A

Fig. 10B

PHOTONIC BURIED INTERPOSER

CROSS-REFERENCE TO RELATED APPLICATION(S)

This application is a U.S. National Stage Patent Application of International Application Number PCT/IB2020/000244, filed Mar. 31, 2020, which claims benefit of U.S. Provisional Patent Application No. 62/827,660, filed Apr. 1, 2019, the entire content of each of which is incorporated herein by reference.

FIELD

One or more aspects of embodiments according to the present invention relate to a buried interposer (BIT), and more particularly to a buried interposer for coupling light between a first optical component and a second optical component of a different size.

BACKGROUND

Figure 1A:
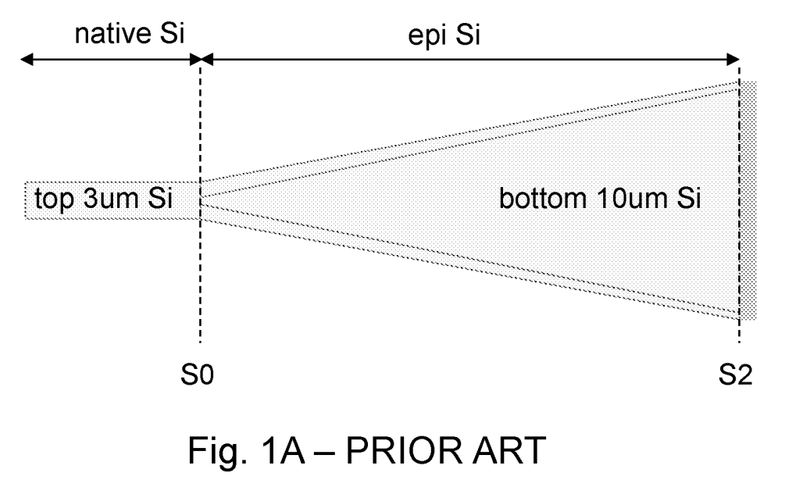
FIG. 1A shows an example of a photonic buried interposer which forms a part of the prior art.

A Buried Interposer (BIT) is a known way of coupling light in-between two optical components of different sizes and therefore supporting different optical modes. A typical BIT is shown in FIG. 1 comprising an adiabatic bi-layer taper with an upper taper and a lower taper, the two tapers stretching from one optical component to another and acting to convert the mode of light in both a vertical and a lateral dimension.

Fabrication capabilities limit the performance of a BIT. These capabilities could include one or more of: minimum linewidth in the lower taper layer, quality of material growth, etching quality, and alignment between the upper taper layer and the lower taper layer. Such fabrication issues may result in devices with a high insertion loss (IL) and a high polarization-dependent loss (PDL). The undesirable effects caused by limitations of the fabrication process cannot be sufficiently mitigated through optimization of the bi-layer taper.

SUMMARY

According to a first aspect of embodiments of the present invention there is provided, a photonic buried interposer for converting light between a first optical mode of a first optical component and a second optical mode of a second optical component, the second optical component being larger than the first optical component;
the buried interposer comprising a bi-layer taper, the bi-layer taper comprising:
a top device layer including an upper tapered waveguide; and
a bottom device layer including a lower tapered waveguide;
wherein the upper tapered waveguide extends from a first end for coupling to the first optical component to a second end for coupling to the second optical component; and the lower tapered waveguide starts from an intermediate location between the first and second ends and extends from the intermediate location to the second end.

In this way, the buried interposer has two stages: a first stage containing only an upper tapered waveguide in a top device layer; and a second stage containing both the upper tapered waveguide in the top device layer and a lower tapered waveguide in a bottom device layer. At the first stage, lateral mode conversion occurs. At the second stage, where an upper taper and lower taper are present, both vertical mode transition and lateral mode conversion occurs. Taking the example of light traveling from the larger optical component into the smaller optical component, during the "second stage" where the upper and lower tapers are present, the optical mode can be reduced in size both laterally and vertically until the light reached the intermediate location. At this point, the upper layer can continue to effect lateral mode conversion, even after the lower taper has reached its minimum width. Advantageously, the invention provides an interposer which is considerably easier to fabricate without adversely affecting performance since it is possible to relax the tip width whilst maintaining good optical properties (i.e. low losses).

It should be considered that the bi-layer taper has a longitudinal direction, extending from the first end to the second end. The width of both the upper taper and the lower taper will increase with proximity to the input/output for the (larger) second optical component. The depth of the second optical component is greater than the depth of the (smaller) first optical component.

The buried interposer may have any one of or, to the extent that they are compatible, any combination of the following optional features.

Optionally, the upper tapered waveguide is a rib waveguide.

Optionally, the upper tapered waveguide has a linear taper between the first optical component and the intermediate location.

Optionally, the upper tapered waveguide and/or the lower tapered waveguide has a nonlinear taper between the intermediate location and the second optical component.

Optionally, the first optical component is an integrated waveguide.

Optionally, the first optical component is a 3 μm rib waveguide.

Optionally, the second optical component is an optical fiber. In such embodiments, the fiber is larger than the integrated waveguide in both a lateral direction (i.e. the width of the fiber or waveguide) and the vertical direction (i.e. the depth of the fiber or the integrated waveguide).

In some embodiments, the optical fiber is a single mode fiber, optionally an SMF28 fiber.

Optionally, the upper tapered waveguide is formed of silicon. In some embodiments, the upper tapered waveguide may be at least partially formed from epitaxially grown silicon. For example, it may comprise an epitaxially grown silicon region and a native or crystalline silicon region. The region of the upper tapered waveguide above the lower tapered waveguide may be formed from epitaxially grown silicon, and the remaining region of the upper tapered waveguide may be formed from native silicon. The upper tapered waveguide may be formed from something other than silicon (e.g. silicon nitride) or a III-V semiconductor material.

Optionally, the lower tapered waveguide is formed of silicon. In some embodiments, the lower tapered waveguide is formed from native silicon. The lower tapered waveguide may be formed from something other than silicon (e.g. silicon nitride) or a III-V semiconductor material. The upper tapered waveguide may be formed of a different material to the material from which the lower tapered waveguide is formed.

Optionally, the minimum width of the lower taper is more than 1 μm. In this way, the minimum tip width is significantly relaxed relative to the single stage bi-layer taper of the prior art.

Optionally, the intermediate location, the width of the lower tapered waveguide is between $1/6^{th}$ and $1/3^{rd}$ of the width of the upper tapered waveguide at the intermediate location. In this way, at the intermediate location, where the transition between the first stage and second stages occurs, the width of the upper layer is optimized so that optical field is maximally pushed upwards to give optical insertion loss and polarization-dependent loss.

Optionally, at the second end, the width of the lower tapered waveguide is equal to the width of the upper tapered waveguide.

Optionally, the shape parameter, a of the tapered waveguide has a value of no less than 0.3 and no more than 0.4. The width of the lower taper at the intermediate location may be at least 0.5 um and no more than 2 um, or may be at least 0.75 um and no more than 1.75 um, or may be at least 1 um and no more than 1.4 um. The width of the upper taper at the intermediate location may be at least 5 um and no more than 7 um, or at least 5.5 um and no more than 6.5 um. The width of the upper taper and lower taper at the second end may be at least 10 um and no more than 16 um, or at least 12 um and no more than 14 um. The length from the first end to the second end may be at least 3 mm and no more than 4 mm, at least 3.25 mm and no more than 3.75 mm, or at least 3.3 mm and no more than 3.7 mm. A length from the intermediate location to the second end may be at least 3 mm and no more than 4 mm, at least 3.25 mm and no more than 3.55 mm, or at least 3.3 mm and no more than 3.5 mm. A length between the first end and the intermediate location may be at least 0.2 mm.

According to a second aspect of the present invention there is provided a method of fabricating a photonic buried interposer for converting light between a first optical mode of a first optical component and a second optical mode of a second optical component, the second optical component being larger than the first optical component; the method comprising:
  creating a bi-layer taper, the bi-layer taper comprising:
    a top device layer including an upper tapered waveguide; and
    a bottom device layer including a lower tapered waveguide;
  wherein the upper tapered waveguide extends from a first end for coupling to the first optical component to a second end for coupling to the second optical component; and the lower tapered waveguide starts from an intermediate location between the first and second ends and extends from the intermediate location to the second end.

Each of the optional features set out above in relation to the first aspect may apply equally to the second aspect.

BRIEF DESCRIPTION OF THE DRAWINGS

These and other features and advantages of the present invention will be appreciated and understood with reference to the specification, claims, and appended drawings wherein:

FIG. 2 shows a further embodiment of a photonic buried interposer according to the present invention, with example measurements. FIG. 2 also shows the results of simulation calculations to determine insertion loss (IL) at various locations along the lateral direction of the buried interposer. Insertion loss has been calculated for a range of different tip widths;

DETAILED DESCRIPTION

The detailed description set forth below in connection with the appended drawings is intended as a description of exemplary embodiments of a photonic buried interposer provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1B:
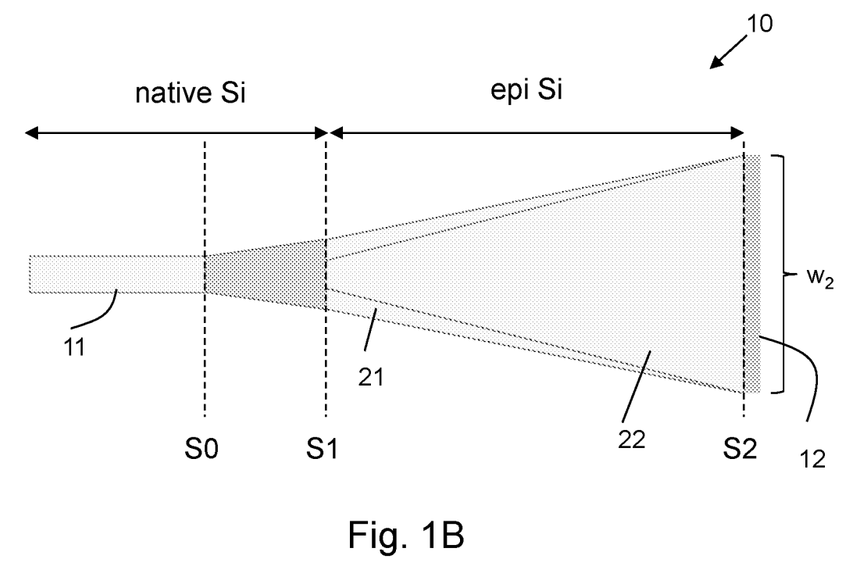
FIG. 1B shows a schematic example of a photonic buried interposer according to an embodiment of the present invention.

A first embodiment of a photonic buried interposer is shown in FIG. 1B. The photonic buried interposer includes a bi-layer taper which includes a top device layer and a bottom device layer, the top device layer comprising an upper tapered waveguide, and the bottom device layer including a lower tapered waveguide.

The upper tapered waveguide 21 extends from a first end S0 of the interposer which is configured to couple to a first optical component to a second end S2 of the interposer which is configured to couple to a second optical component, the second optical component having a larger width as compared to the first optical component. Unlike prior art designs such as that shown in FIG. 1A, the lower tapered waveguide 22 does not extend from the first end to the second end of the interposer. Instead of starting at the first end, it starts at an intermediate location S1, the intermediate location being between the first end and the second end. The lower tapered waveguide 22 extends from the intermediate location, along the longitudinal axis of the tapered waveguide to the second end S1 of the interposer. As can be seen from FIG. 1B, the interposer therefore contains a first region from the first end S0 to the intermediate location S1 which includes only a single tapered layer, and a second region from the intermediate location S1 to the second end S2 which is made up of a bi-layered taper. It has been found that this act of moving the start of the lower taper to an intermediate location gives rise to the advantage that the width of the lower taper is less crucial; it is possible to relax the width of the lower taper without suffering severe optical losses. This is not possible in the prior art design of FIG. 1A.

At the second end S2 of the interposer, the width of the upper taper 21 is the same as or substantially the same as the width of the lower taper 21.

The depth of the upper taper may be 3 μm. This is typically formed from the silicon layer of an SOI substrate, or may be epitaxially grown. Advantageously, this can couple to a 3 μm SOI waveguide 11 such as a rib waveguide, which may form the first optical component. The depth of the bottom taper at the second end (for coupling to the larger optical component) may be up to 10 μm. In the embodiment shown here, the lower taper is also formed from silicon. The second optical component may take the form of an optical fiber.

Figure 2:
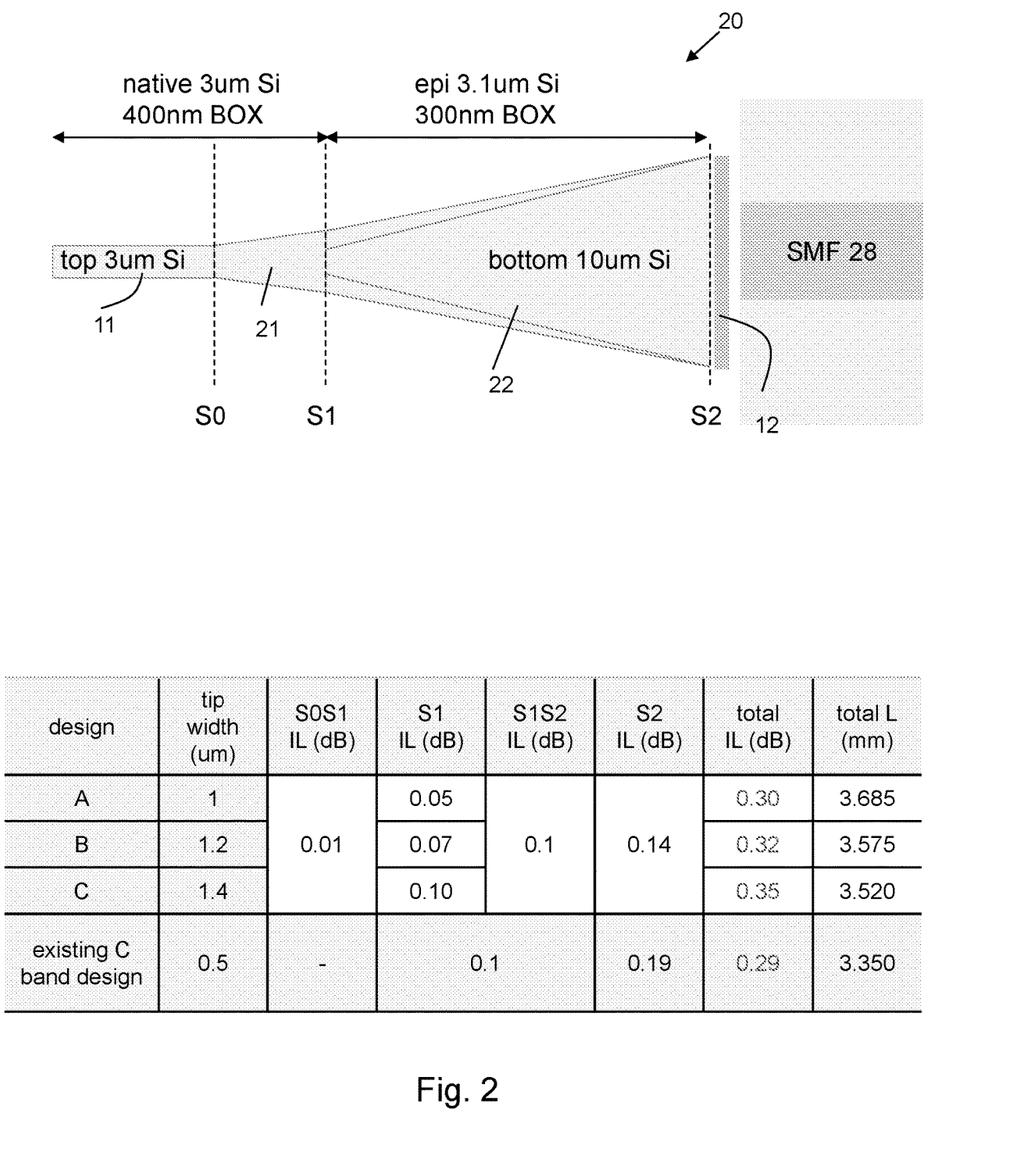

A further embodiment of a buried interposer is now described in relation to FIG. 2. Example measurement parameters are shown in the figure, from which it can be seen that the upper taper layer may be formed from an epitaxially grown 3 μm Si layer (on a 400 nm buried oxide (BOX) layer) and the lower taper from a native 3.1 μm silicon layer (on a 300 nm BOX layer). The table included in FIG. 2 shows the results of simulation calculations for this embodiment to determine insertion loss (IL) at various locations along the lateral direction of the buried interposer. Insertion loss has been calculated for a range of different tip widths ranging from 1 μm to 1.4 μm. Total insertion loss values for these tip widths range from 0.30 to 0.35 dB. This compares favourably with the insertion loss of 0.29 dB measured for the pre-existing design (such as that of FIG. 1A) which requires a tip width of only 0.5 μm.

Figure 3:
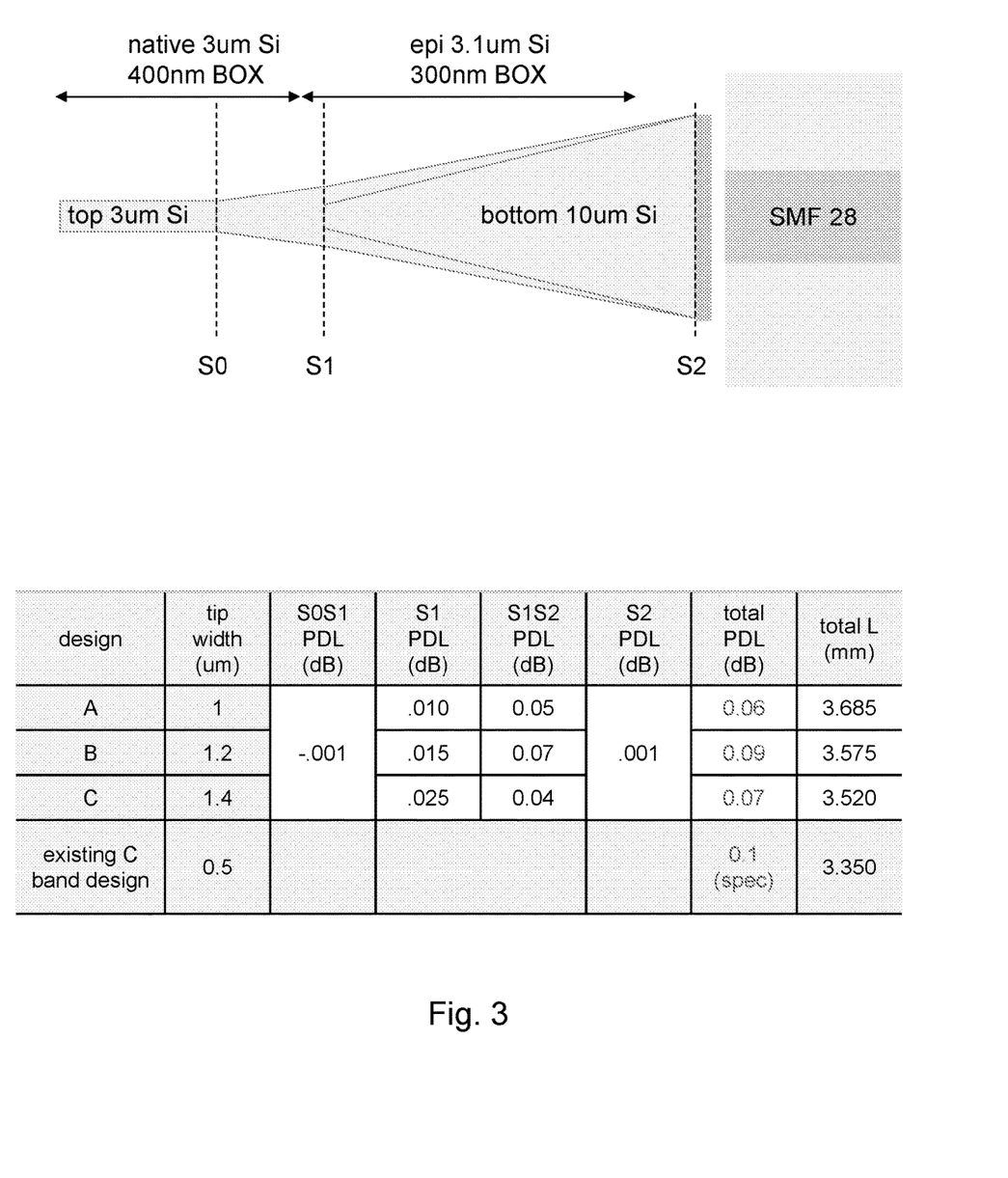
FIG. 3 shows further simulations for the photonic buried interposer of FIG. 2 with example measurements and also results of simulation calculations to determine polarization dependent loss (PDL) at various locations along the lateral direction of the buried interposer. PDL has been calculated for a range of different tip widths.

FIG. 3 shows corresponding calculations of polarization dependent loss (PDL) calculated for the same embodiment. Again, as can be seen from the table within FIG. 3, the width of the bottom taper can be relaxed whilst still avoiding unacceptable losses.

Figure 4A:
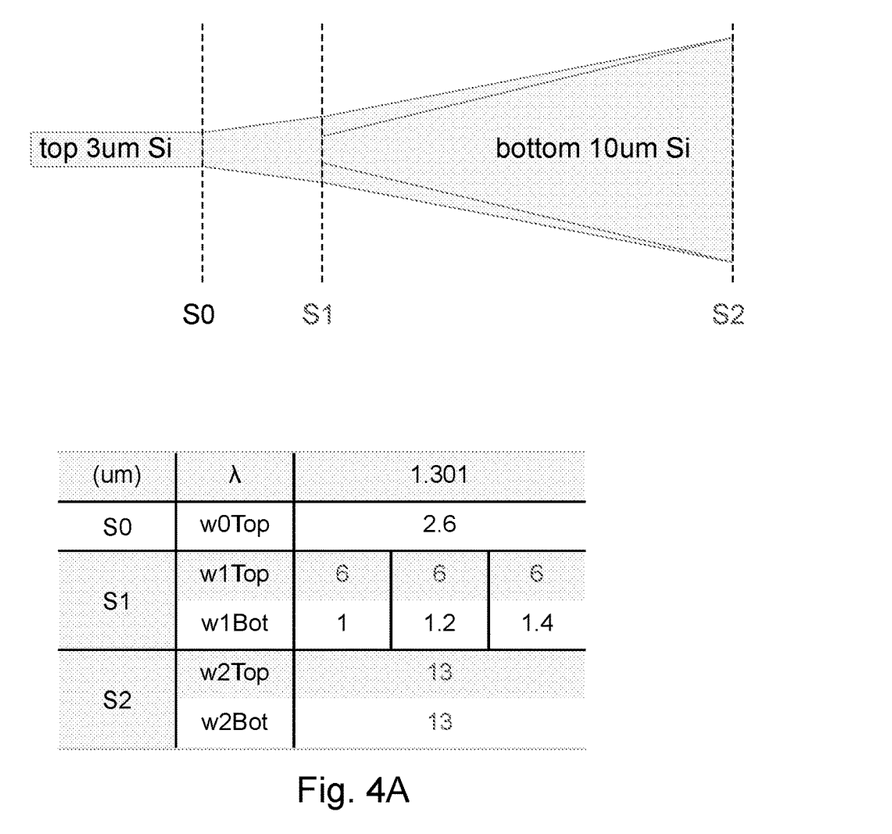
FIG. 4A shows a top view of an embodiment of the present invention and contains example dimensions at given points with reference to FIG. 4A whilst
Figure 4B:
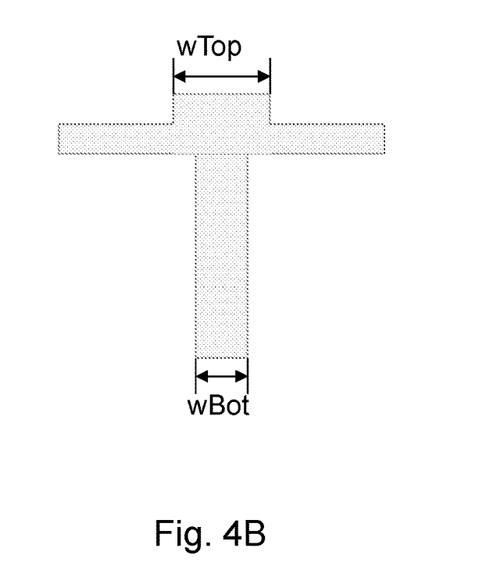
FIG. 4B shows a side view of the embodiment of FIG. 4A.

Examples of taper widths are described below with reference to FIGS. 4A and 4B. The widths may be selected for a specific wavelength of range of wavelengths. In the embodiment shown in FIGS. 4A and 4B, the width of the upper tapered waveguide at the first end S0 of the interposer is 2.6 μm. At the intermediate location S1, an example width of the upper tapered waveguide wTop is 6 μm, whereas the lower tapered waveguide will have a width which is less than a third of the value of the upper tapered waveguide. In the embodiment shown, example widths wBot of the lower tapered waveguide at the intermediate location S1 where it begins are given as: 1 μm, 1.2 μm and 1.4 μm. The relative widths of any one of these examples is shown schematically in FIG. 4B, from which it can be seen that the upper tapered layer is significantly wider than the lower tapered layer, the upper taper extending laterally over the lower taper by equal amounts on either side of the waveguide. That is to say, in the region from the intermediate location S1 to the second end S2, the upper tapered waveguide and lower tapered waveguide lie directly on top of one another so that the longitudinal axis of the upper tapered waveguide is located directly above and in line with the longitudinal axis of the lower tapered waveguide.

Figure 5A:
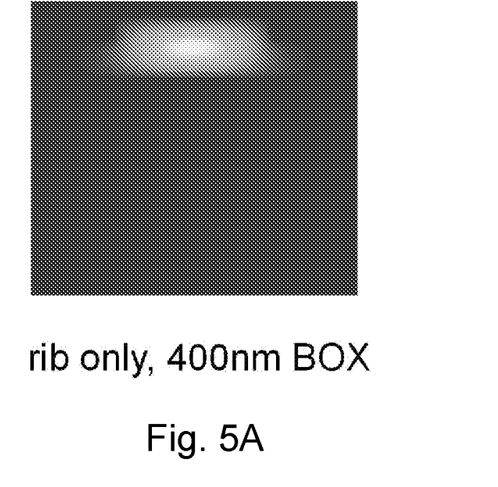
FIG. 5A and FIG. 5B each depict simulation measurements made at points S0 and S1 respectively on the embodiment shown in FIG. 4A.
Figure 5B:
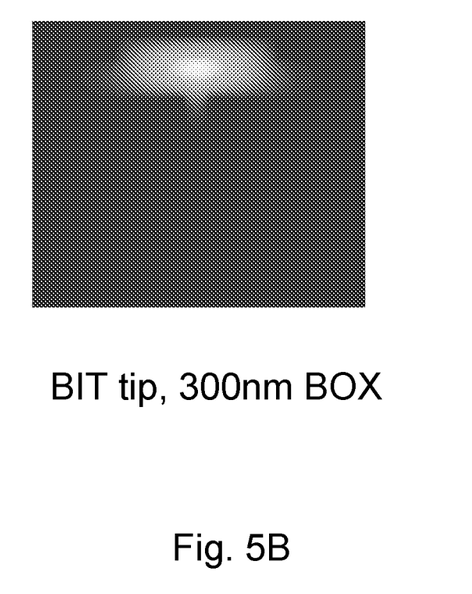

FIG. 5A and FIG. 5B each depict simulation measurements made at the first end of the interposer (S0) and the second end of the interposer (S1) respectively.

Figure 6:
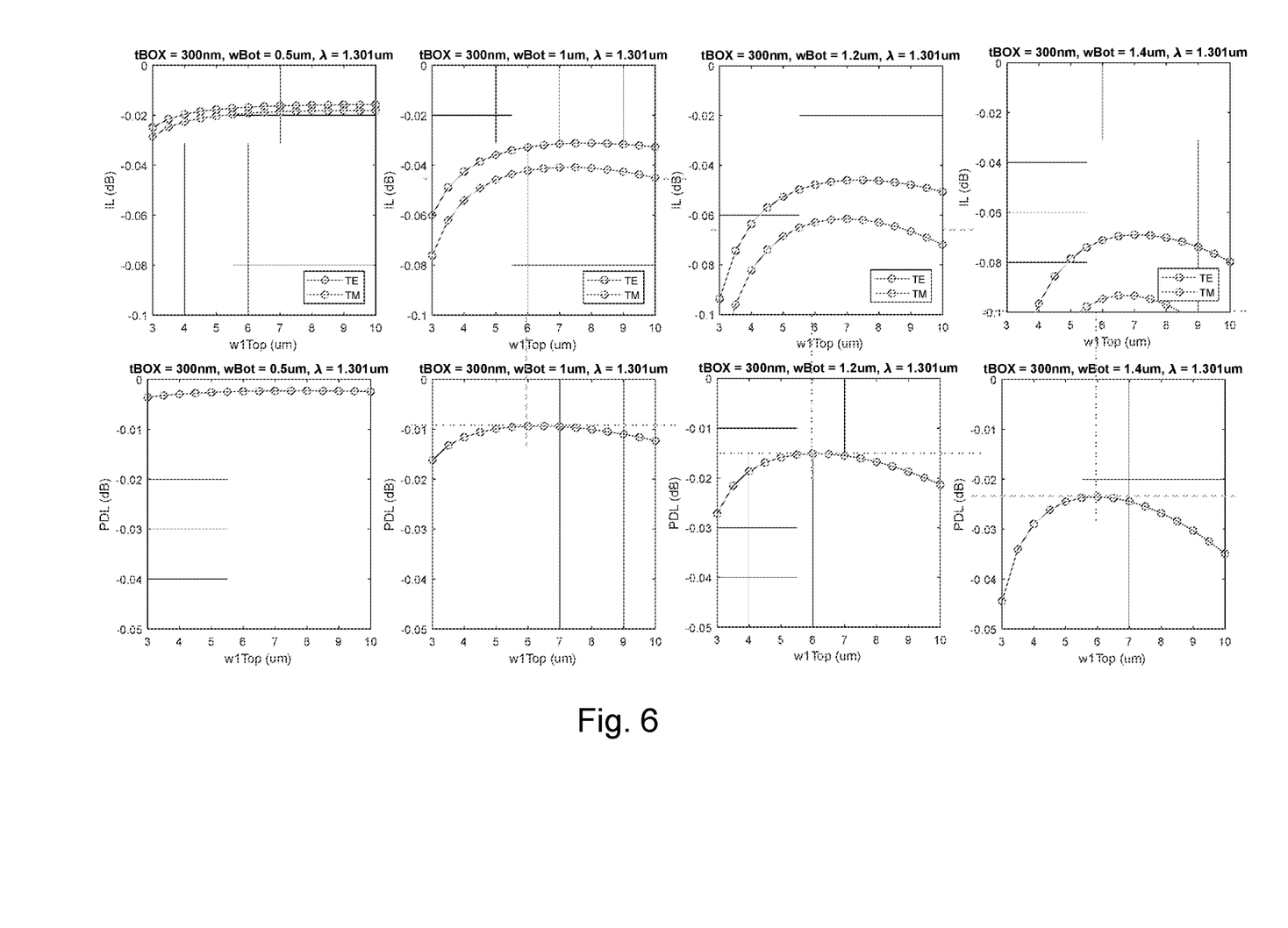
FIG. 6 shows simulation data for insertion loss and polarization dependent loss as a function of width.

FIG. 6 shows simulation data for insertion loss (upper four plots) and polarization dependent loss (lower four plots) as a function of width wTop of the upper tapered waveguide at the intermediate location S1.

Figure 7A:
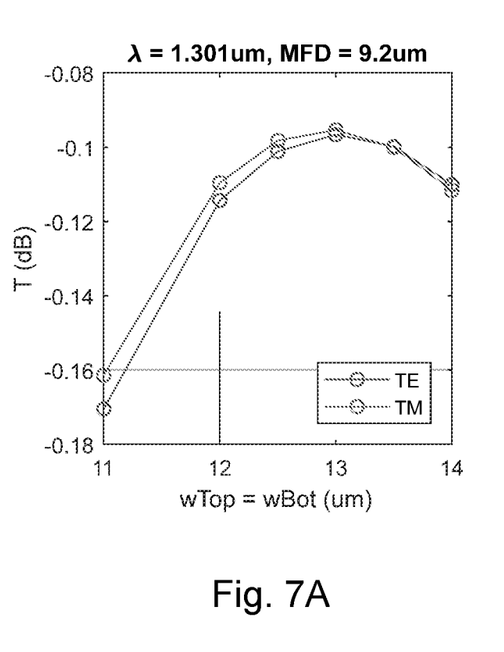
FIG. 7A depicts a plot of transmission vs width at the second end of the interposer.
Figure 7B:
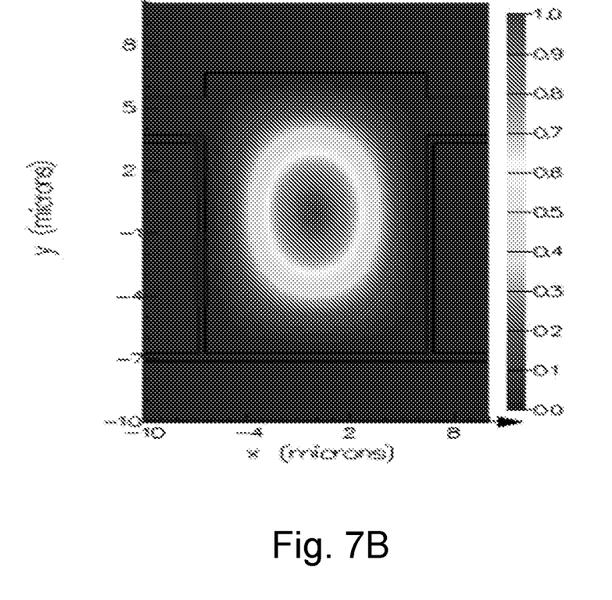
FIG. 7B shows a simulation of a mode at stage S2 of the interposer contrasted with a simulation of a Gaussian mode in FIG. 7C such as that which may be found in an optical fiber.
Figure 7C:
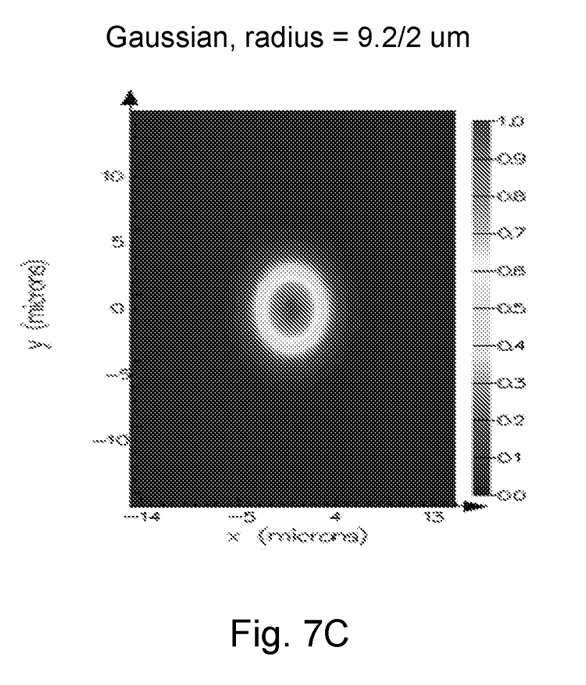

FIG. 7A shows a plot of transmission vs width of the upper and lower tapered waveguides (wTop, wBot) at the second end of the interposer (at which point wTop=wBot). The calculations are carried out and plotted separately for TE and TM polarizations. Simulations of the mode profile are shown in FIG. 7B, which relates to the mode at stage S2 of the interposer and in FIG. 7C, which shows a simulation of a standard Gaussian mode.

Figure 8:
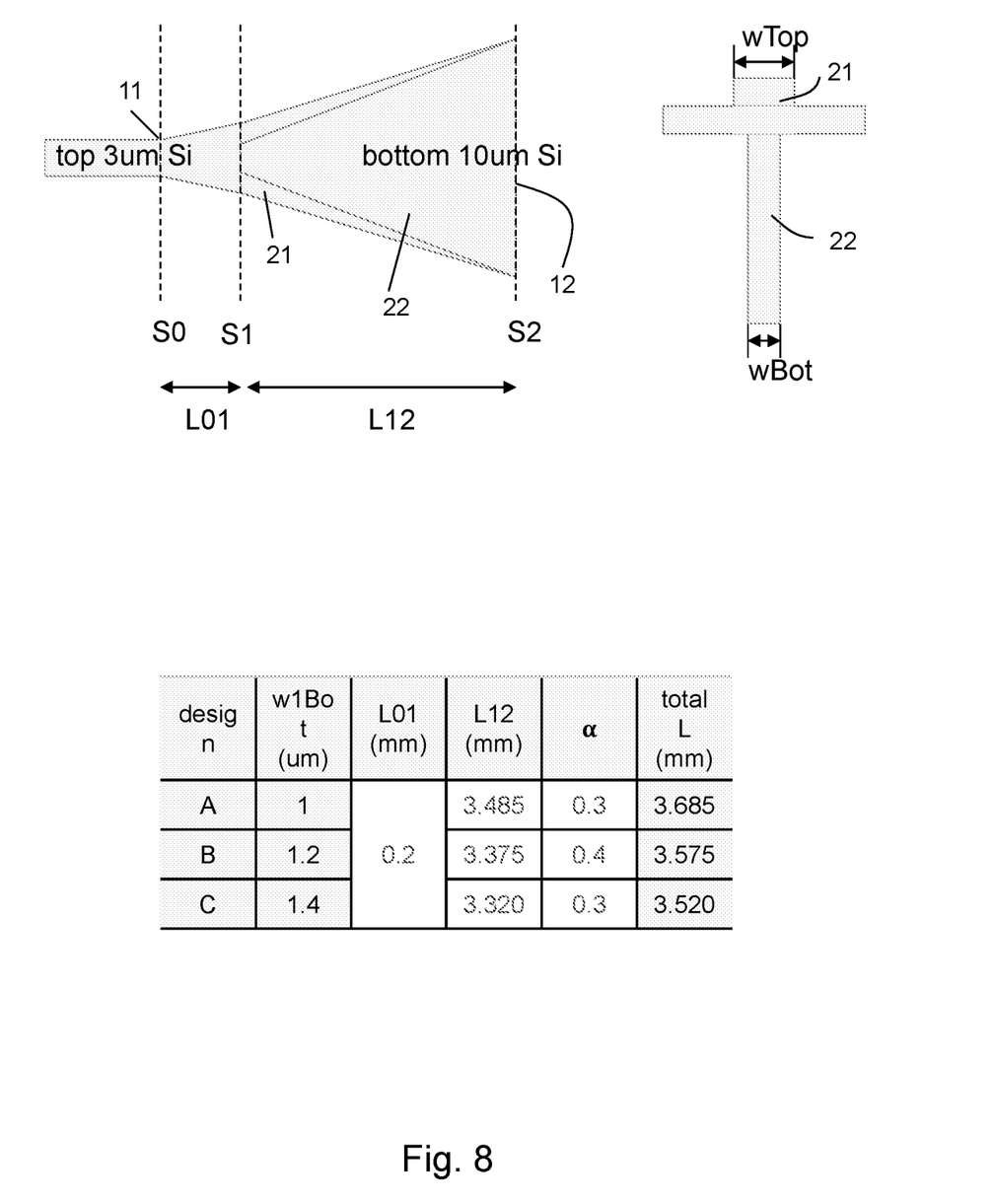
FIG. 8 shows a top view of an embodiment of the present invention, a corresponding top view, and examples of possible taper parameters for an embodiment of the present invention.

FIG. 8 depicts the effect of shape parameter a on the operation of the interposer. In the example shown, the single layer tapered section of the interposer from the first end S0 to the intermediate location S1 is linear. However, the bi-layer tapered section from the intermediate location S1 to the second end S2 is non-linear. Different example values of the shape parameter a include: 1.2 μm and 1.4 μm.

Figure 9A:
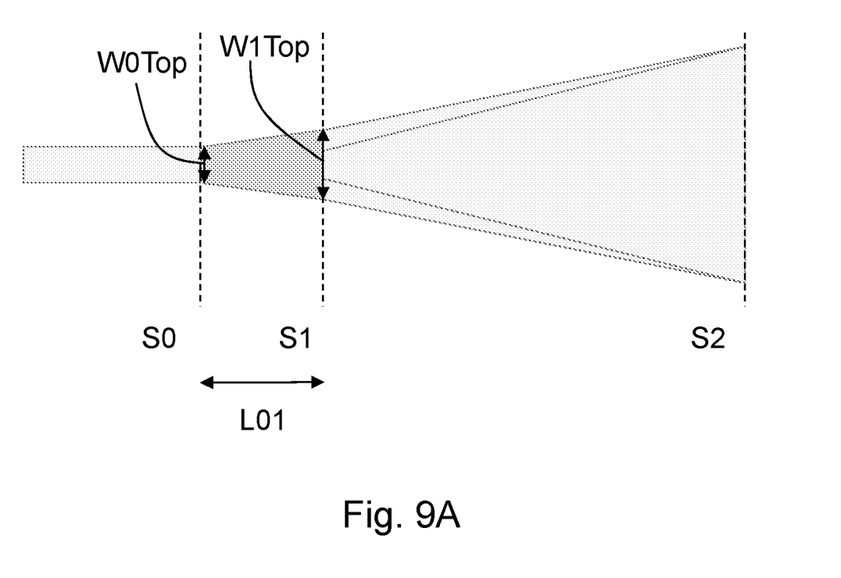
FIG. 9A shows an embodiment of an interposer and FIG. 9B shows a simulation of insertion loss vs length in the single layer region from S0 to S1 as shown in FIG. 9A.
Figure 9B:
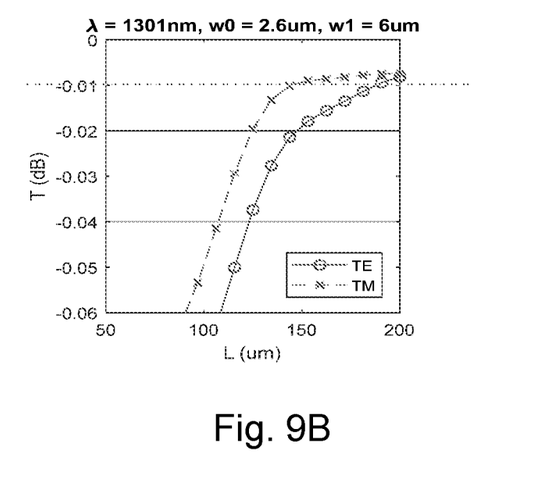

The effect of the length L01 of the single layer portion of the interposer can be understood with reference to FIG. 9A and FIG. 9B, which show transmission vs length. These calculations were made for a simple adiabatic linear taper in native 3 μm silicon. The upper taper had a width at the first end (w0Top) of 2.6 μm and a width at the intermediate location (w1Top) of 6 μm. It has been discovered that, under these conditions, for a length of 200 μm, it is possible to achieve an insertion loss of less than 0.01 dB. This shows that a simple linear design is sufficient to achieve low losses in a short length for the first section.

Figure 10A:
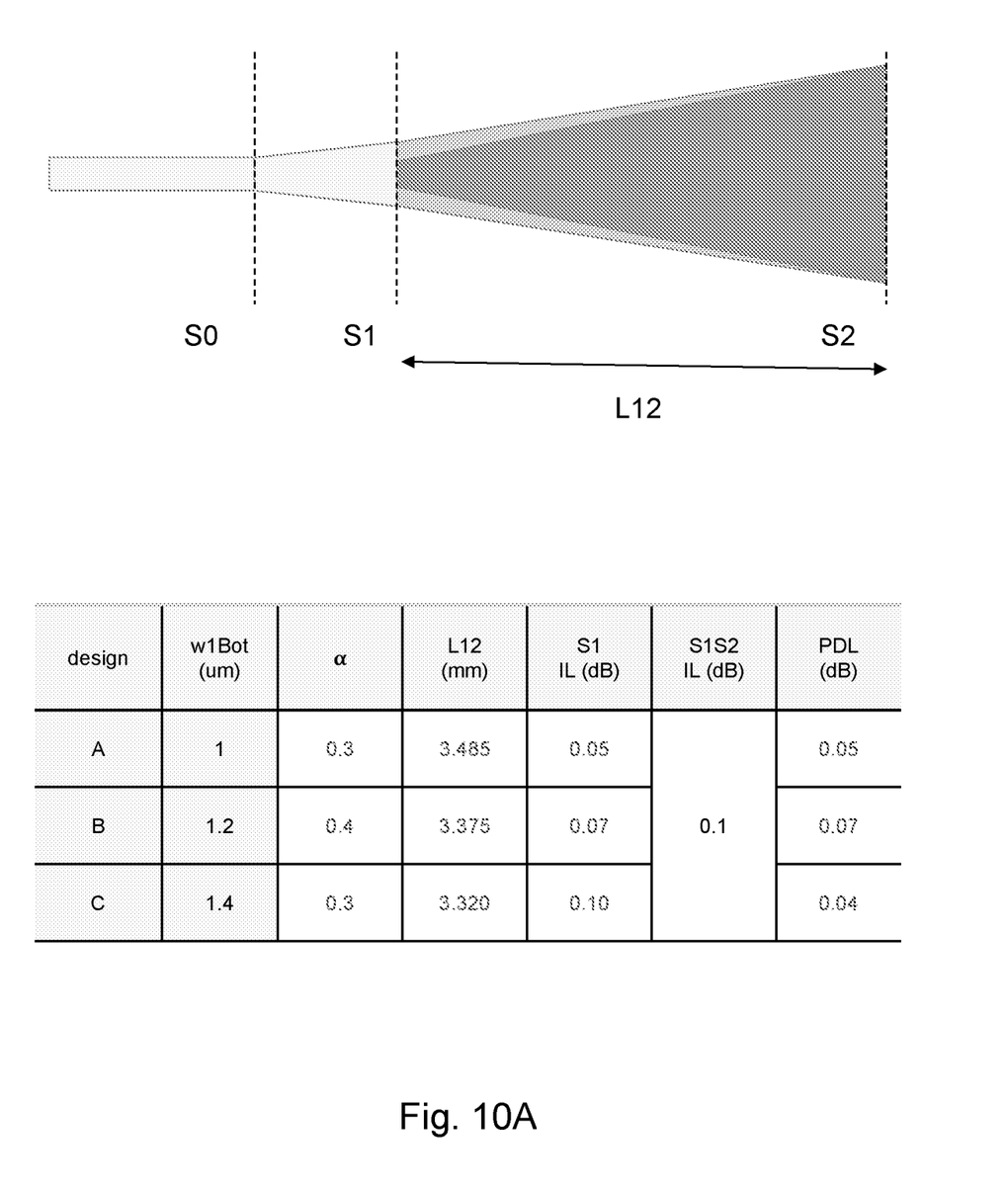
FIG. 10A shows an alternative view of the embodiment of FIG. 9A with the bi-layer section from S1 to S2 highlighted along with simulation results for a range of parameters.
Figure 10B:
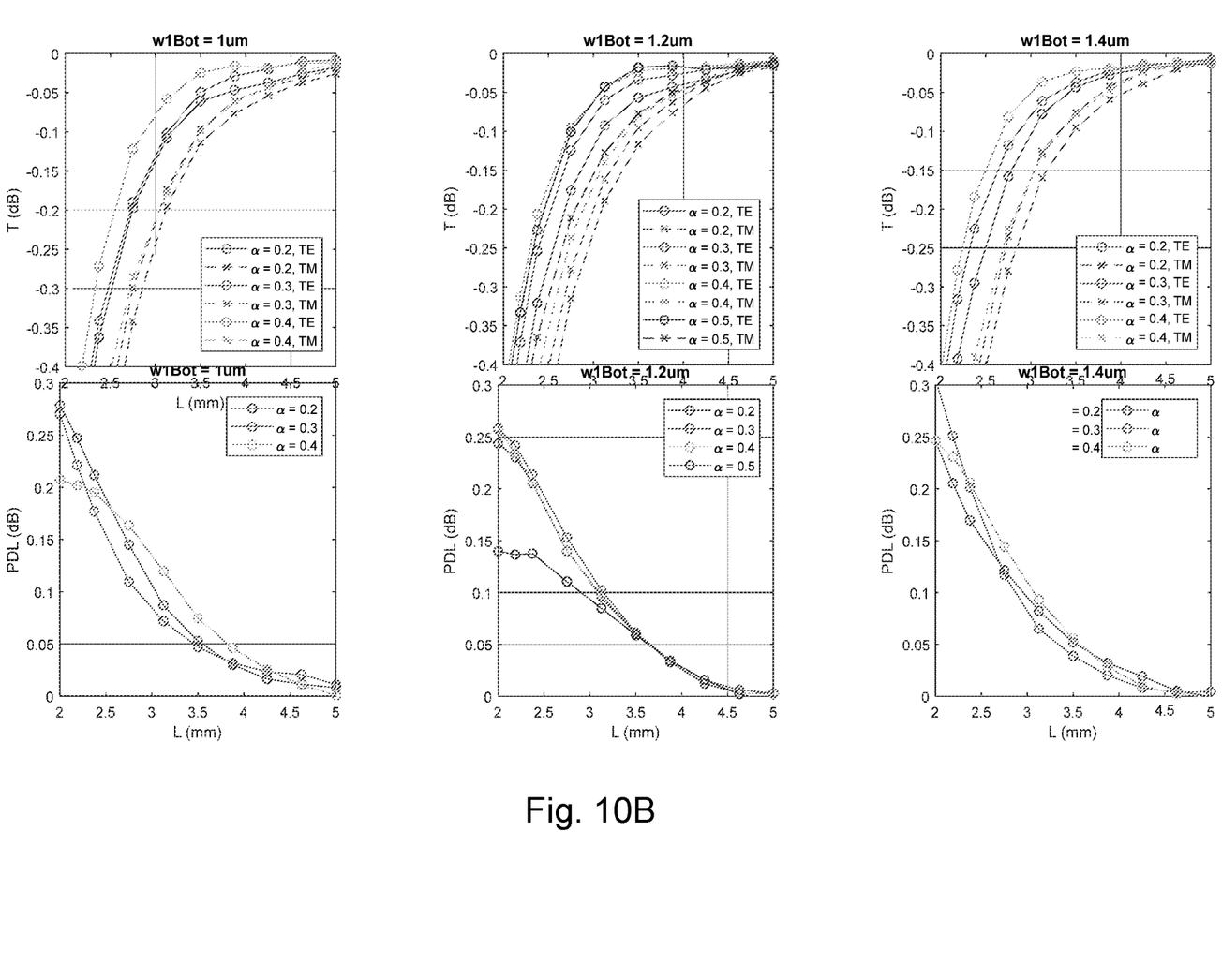
FIG. 10B shows calculations of transmission and polarization dependent loss for various parameters including the example widths shown in FIG. 10A.

FIG. 10A shows an alternative view of the embodiment of FIG. 9A with the bi-layer section from S1 to S2 highlighted along length L12, examples of different measurement parameters for this bi-layer section are shown in the table below. The effect of these parameters can be seen in the simulation plots of FIG. 10B. The top three plots show transmission vs width for three different taper widths (at the intermediate location S1) of 1 μm, 1.2 μm, and 1.4 μm for a range of shape parameter values. The lower three plots show polarization dependent loss vs length L12 for each of the same taper widths 1 μm, 1.2 μm, and 1.4 μm for a range of shape parameter values.

Although exemplary embodiments of a photonic buried interposer have been specifically described and illustrated herein, many modifications and variations will be apparent to those skilled in the art. Accordingly, it is to be understood that a photonic buried interposer constructed according to principles of this invention may be embodied other than as specifically described herein. The invention is also defined in the following claims, and equivalents thereof.

What is claimed is:

1. A photonic buried interposer for converting light between a first optical mode of a first optical component and a second optical mode of a second optical component, the second optical component being larger than the first optical component;

the photonic buried interposer comprising a bi-layer taper, the bi-layer taper comprising:
a top device layer comprising an upper tapered waveguide; and
a bottom device layer comprising a lower tapered waveguide;
wherein the upper tapered waveguide extends from a first end for coupling to the first optical component to a second end for coupling to the second optical component; and the lower tapered waveguide starts from an intermediate location between the first and second ends and extends from the intermediate location to the second end, and
wherein the upper tapered waveguide is a rib waveguide having a slab portion and a tapered ridge extending from the slab portion, the lower tapered waveguide being directly on an opposite side of the slab portion from the ridge.

2. The photonic buried interposer of claim 1, wherein the upper tapered waveguide has a linear taper between the first optical component and the intermediate location.

3. The photonic buried interposer of claim 1, wherein the upper tapered waveguide and/or the lower tapered waveguide has a nonlinear taper between the intermediate location and the second optical component.

4. The photonic buried interposer of claim 1, wherein the first optical component is an integrated waveguide.

5. The photonic buried interposer of claim 4, wherein the first optical component is a 3 μm rib waveguide.

6. The photonic buried interposer of claim 1, wherein the second optical component is an optical fiber.

7. The photonic buried interposer of claim 1, wherein the upper tapered waveguide is formed of silicon.

8. The photonic buried interposer of claim 1, wherein the lower tapered waveguide is formed of silicon.

9. The photonic buried interposer of claim 7, wherein the upper tapered waveguide is formed from epitaxially grown silicon.

10. The photonic buried interposer of claim 1, wherein a minimum width of the lower tapered waveguide is more than 1 μm.

11. The photonic buried interposer of claim 1, wherein, at the intermediate location, a width of the lower tapered waveguide is between $1/6^{th}$ and $1/3^{rd}$ of a width of the upper tapered waveguide at the intermediate location.

12. The photonic buried interposer of claim 1, wherein a shape parameter, $\alpha$, of the lower tapered waveguide has a value of no less than 0.3 and no more than 0.4.

13. A method of fabricating a photonic buried interposer for converting light between a first optical mode of a first optical component and a second optical mode of a second optical component, the second optical component being larger than the first optical component;

the method comprising:
creating a bi-layer taper, the bi-layer taper comprising:
a top device layer including an upper tapered waveguide; and
a bottom device layer including a lower tapered waveguide;
wherein the upper tapered waveguide extends from a first end for coupling to the first optical component to a second end for coupling to the second optical component; and the lower tapered waveguide starts from an intermediate location between the first and second ends and extends from the intermediate location to the second end, and
wherein the upper tapered waveguide is a rib waveguide having a slab portion and a tapered ridge extending from the slab portion, the lower tapered waveguide being directly on an opposite side of the slab portion from the ridge.

14. The method of claim 13, wherein the upper tapered waveguide is at least partially formed from epitaxially grown silicon.

15. A photonic buried interposer for converting light between a first optical mode of a first optical component and a second optical mode of a second optical component, the second optical component being larger than the first optical component;

the photonic buried interposer comprising a bi-layer taper, the bi-layer taper comprising:
a top device layer comprising an upper tapered waveguide; and
a bottom device layer comprising a lower tapered waveguide;
wherein the upper tapered waveguide extends from a first end for coupling to the first optical component to a second end for coupling to the second optical component; and the lower tapered waveguide starts from an intermediate location between the first and second ends and extends from the intermediate location to the second end, and
wherein the upper tapered waveguide has:
a linear taper between the first optical component and the intermediate location; and
a nonlinear taper between the intermediate location and the second optical component.

16. The photonic buried interposer of claim 15, wherein the upper tapered waveguide is a rib waveguide.

* * * * *